(No Model.) 2 Sheets—Sheet 1.
S. D. LOCKE.
CAR COUPLING.
No. 378,013. Patented Feb. 14, 1888.
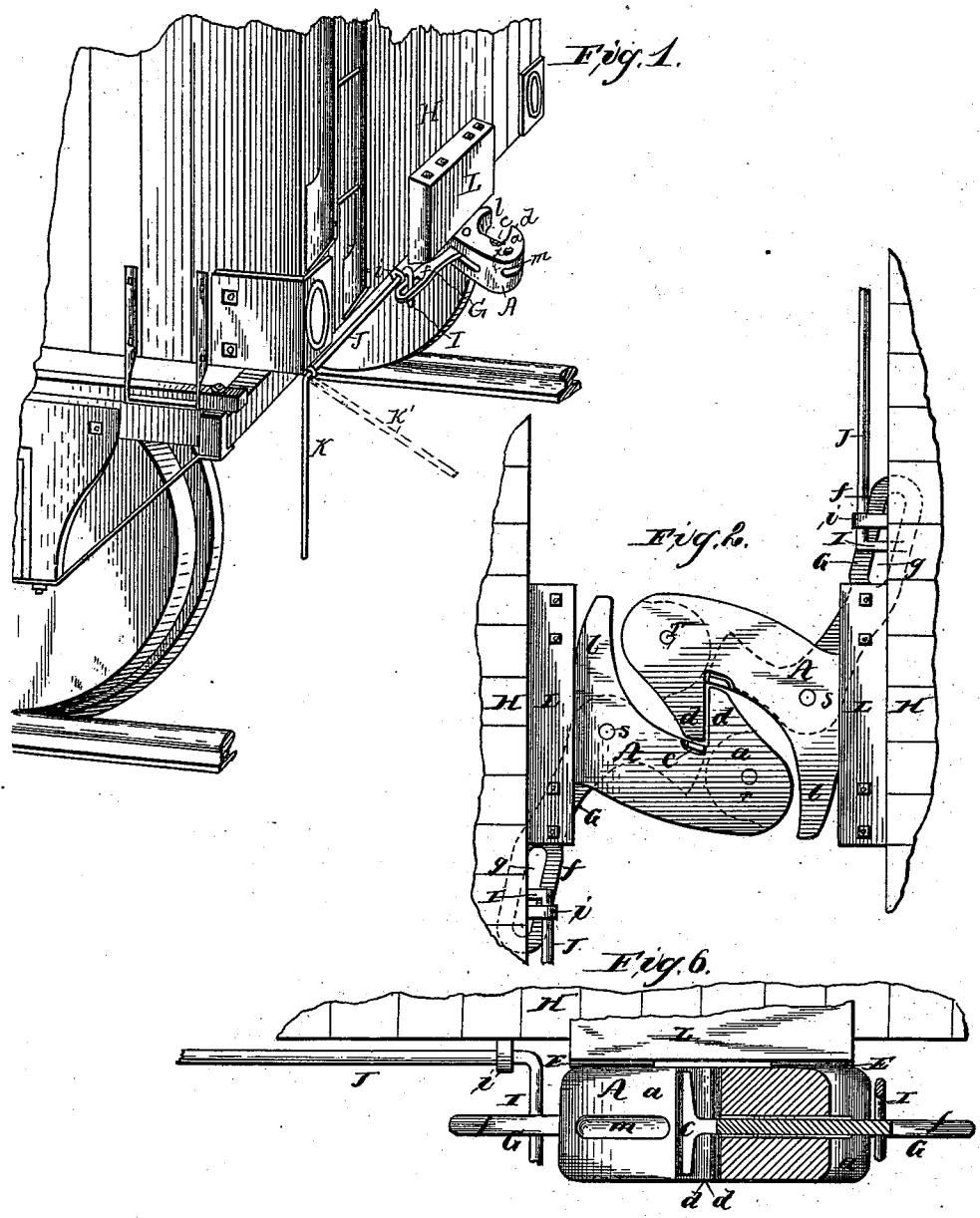
Witnesses
N. W. Locke
E. J. Locke
Inventor
Sylvanus D. Locke (No Model.) 2 Sheets—Sheet 2.
S. D. LOCKE.
CAR COUPLING.
No. 378,013. Patented Feb. 14, 1888.
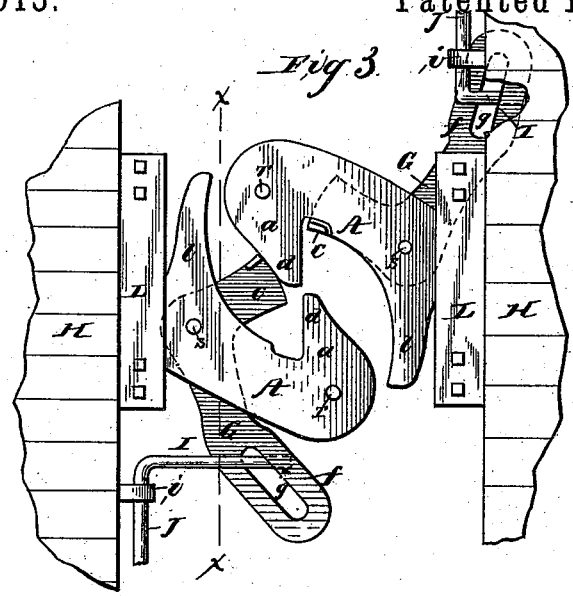
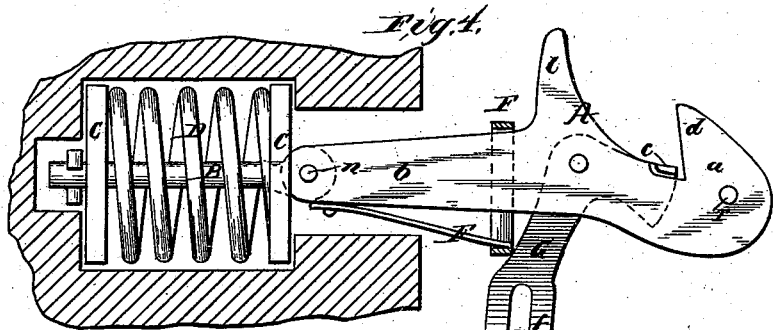
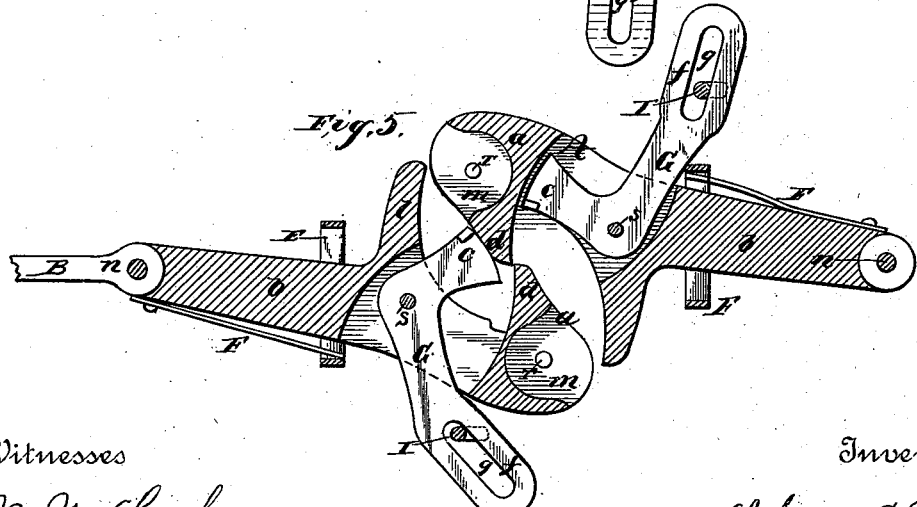
Witnesses
N. W. Locke
E. J. Locke
Inventor
Sylvanus D. Locke

UNITED STATES PATENT OFFICE.

SYLVANUS D. LOCKE, OF HOOSICK FALLS, NEW YORK.

CAR-COUPLING.

SPECIFICATION forming part of Letters Patent No. 378,013, dated February 14, 1888.

Application filed December 22, 1887. Serial No. 258,780. (No model.)

*To all whom it may concern:*

Be it known that I, SYLVANUS D. LOCKE, of Hoosick Falls, in the county of Rensselaer and State of New York, have invented certain new and useful Improvements in Car-Couplings, of which the following is a specification.

My invention has for its object the improvement of the hook-coupler, so as to avoid the pivoted head or knuckle-joint in the same and to adapt it to freight-cars; and it consists of the following parts, namely: first, in the employment of a cam-arm or other equivalent mechanism acting between two coupled hooks constructed with the hook parts integral with the stem or draw parts, after the manner of the Miller hook, to drive them apart to uncouple; second, in the employment of an elbow-lever pivoted in a hook and operated by a lever through an intermediate rock-shaft and arm on the car to press the end of the elbow-lever against the opposing hook and so crowd the hooks out of engagement; third, in so constructing the points of the hooks and the cam-arm or elbow-lever and arranging them in connection with the operating-lever that the elbow-lever, after it has acted to crowd an opposing hook out of engagement, shall also serve as a locking mechanism to hold it out until the cars separate, when the withdrawal of the opposing hook shall allow the operating-lever to fall, so returning the elbow-lever to its first position; and, fourth, my invention also consists in such other details and combinations as are hereinafter set forth and claimed.

That others may understand my invention, I will proceed to describe its construction and operation, reference being had to the accompanying drawings, making a part of this specification, in which—

Figure 1 is a perspective view showing my coupler attached to a car. Fig. 2 is a top or plan view showing two couplers attached to different cars coupled together. Fig. 3 is a top or plan view of the same, showing the hooks driven apart to uncouple. Fig. 4 is a top or plan view showing one mode of attaching the coupler to a car. Fig. 5 is a horizontal section through the two hooks shown in Fig. 3; and Fig. 6 is a cross-section on the line $x\ x$, Fig. 3, and looking toward the end of the hook.

In the drawings, A represents the hook that, like the Miller hook, has its head or hook part $a$ fast on the stem or body part $b$. The hook is preferably pivoted on the draw-pin B, that is supported in the collar-plates C, and carries a buffer-spring, D, as in other and ordinary forms of draw-bar. The hook rests in the usual yoke, E, and is held against the side of the yoke when not coupled in the engaging position by the spring F. Pivoted at $s$, in a horizontal mortise or chamber in the neck of the hook, is an elbow-lever, G, that has its outer or working end, $c$, held normally in the neck of the hook just back of the point of the other hook engaged therewith, as shown in Fig. 2. This outer end, $c$, is extended up and down, or broadened, as shown, so as to more certainly engage with the point $d$ of the opposing hook in all possible positions up and down of the latter. The rear end, $f$, of the elbow-lever extends laterally as well as back toward the car H, and is connected by a slot, $g$, to the lower end of the arm I, reaching down from the rock-shaft J, that is secured to and takes bearing by means of the clips or boxes $i$ in the end of the car. This rock-shaft extends out to or near to the corner of the car, and terminates in a hand-lever, K, that normally depends vertically from the shaft.

To uncouple two hooks engaged as shown in Fig. 2, it is only necessary to swing the hand-lever outward and upward, so turning the rock-shaft and swinging forward the arm I and the rear end, $f$, of the elbow-lever, and, through the end $c$ of the latter, crowding the point $d$ of the hook out of engagement, as shown in Fig. 3. When this is done, the arrangement and form of the parts are such that the end $c$ serves as a locking mechanism, not only automatically locking the hook against re-engagement, but also preventing the falling of the hand-lever and consequent return of the rock-shaft and elbow-lever to their normal positions until the cars are separated and the hooks drawn apart, even though the brakemen have let go of the hand-lever and gone to a distant part of the train. When the cars do separate, the falling of the hand-lever automatically returns all parts to their normal position, ready for coupling again.

The hook is preferably constructed with a buffer-ledge, $l$, cast or otherwise made, fixed thereon or integral therewith. Each of the hooks A A, attached to the cars H, and coupling them together, as shown in Fig. 2, are alike, and their operating hand-levers K extend therefrom in opposite directions and appear on opposite sides of the train, so presenting, in a train equipped with my coupling-hooks, hand-levers on both sides thereof, to uncouple the train at all points.

It is apparent to a skilled mechanic that many devices other than the elbow-lever—such as a circular cam or wedge pivoted in the neck of the hook and concentric with its pivot—may be used to drive the hooks apart, and I do not limit my invention to the elbow-lever, but consider that it embraces the employment or use of any mechanical device mounted or seated in one hook and forcibly acting therefrom against the point of another hook to separate and so uncouple them. In place of the arm, rock-shaft, and hand-lever, other operating devices may be employed without affecting or changing the scope of the main part of my invention.

What I claim is—

1. In a car-coupling, a coupling-hook having its hook part constructed integral with its body part, combined with an opening and locking lever pivoted in the neck thereof and working against another hook coupled therewith, whereby the hooks are driven apart and locked against recoupling until after the cars are separated, substantially as described.

2. In a car-coupling, the combination of the hooks A, combined with the slotted lever G, pivoted therein, and an operating-lever, substantially as specified.

3. In a car-coupling, the hook A and elbow-lever G, combined with the arm I, rock-shaft J, and hand-lever K, substantially as and for the purpose set forth.

SYLVANUS D. LOCKE.

Witnesses:
N. W. LOCKE,
E. J. LOCKE.